Jan. 8, 1935.　　　　J. H. ROETHEL　　　　1,987,128
REAR QUARTER WINDOW REGULATOR
Filed June 20, 1934
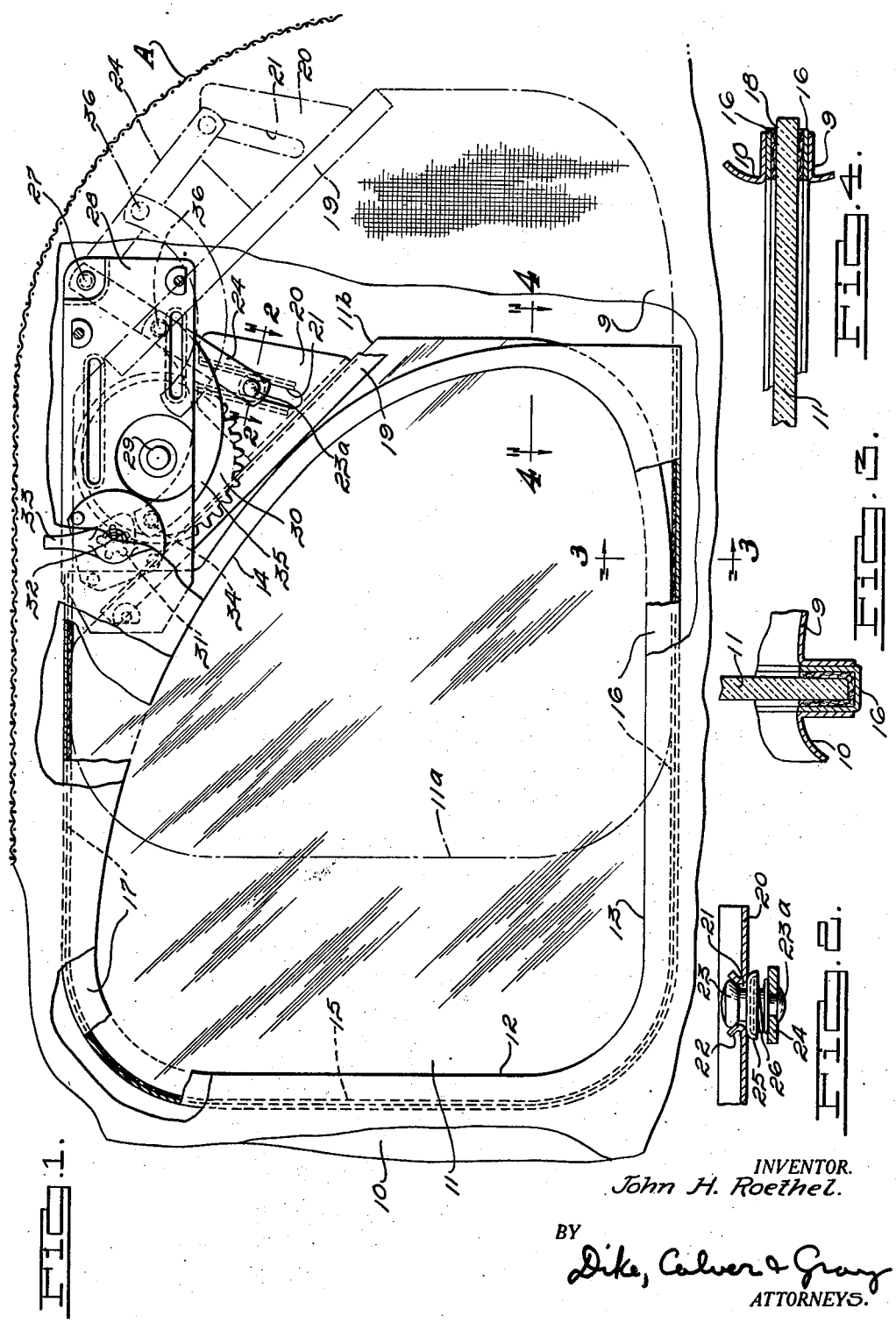
INVENTOR.
John H. Roethel.
BY
ATTORNEYS.

Patented Jan. 8, 1935

1,987,128

UNITED STATES PATENT OFFICE 1,987,128

REAR QUARTER WINDOW REGULATOR

John H. Roethel, Detroit, Mich.

Application June 20, 1934, Serial No. 731,397

9 Claims. (Cl. 268—126)

This invention relates to regulator mechanism for vehicle body windows and particularly, although not exclusively, to improved regulator means for opening and closing windows, especially the rear quarter windows, of automobile bodies where such windows are mounted to slide horizontally in their planes into and out of closed positions.

An object of the invention is to provide an improved window regulator of simplified economical and compact construction adapted to be connected to a rear quarter window of a vehicle body for shifting the glass into and out of ventilating position.

A further object of the invention is to provide an improved regulator for opening and closing a vehicle body rear quarter window having improved means embodied in the glass operating parts for locking the window when closed, thus simplifying the structure by eliminating relatively expensive clutch means heretofore used.

A further object of the invention is to provide an improved regulator mechanism for a rear quarter window of an automobile, which mechanism is adapted to be mounted in the body in improved manner above the lower edge of the glass and preferably near the top rear end thereof, and is operative to shift the glass forwardly and rearwardly in its plane while at the same time having its operative handle or crank in a convenient location out of the way of the passenger's arm.

Other objects of this invention will appear in the following description and appended claims, reference being had to the accompanying drawing forming a part of this specification wherein like reference characters designate corresponding parts in the several views.

Fig. 1 is a fragmentary side elevation illustrating a window regulator mechanism for the rear quarter window of an automobile.

Fig. 2 is a detail section taken through lines 2—2 of Fig. 1 in the direction of the arrows.

Fig. 3 is a detail section taken through lines 3—3 of Fig. 1 in the direction of the arrows.

Fig. 4 is a detail section taken through lines 4—4 of Fig. 1 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is illustrated, by way of example, one form of regulating mechanism embodying the invention and designed for operating the rear quarter window of an automobile body. The inner and outer framing or paneling 9 and 10 respectively, forms a rear quarter window opening which is adapted to be closed by means of a glass panel 11, this panel being mounted in the framing so as to slide horizontally in the plane of the glass. This framing provides a window reveal defining the window opening and it will be seen that in the present instance the reveal has a front vertical edge 12, a lower horizontal edge 13 and a curved sloping rear edge 14, the curvature of the latter approximating the curvature of the rear end of the body indicated, for example, by the line A. The forward edges of the window glass are normally confined in felted glass channels comprising a front vertical channel portion 15 for housing the forward edge 11a of the glass when closed, a bottom felted channel 16 for confining and slidingly supporting the lower edge of the glass, and a top horizontal channel 17 for confining the upper edge of the glass. The top and bottom channels 17 and 16 provide parallel horizontal runways for the upper and lower horizontal edges of the glass. In order to permit the glass to slide rearwardly to the position shown in dotted lines the rear channel is slotted as indicated at 18 in Fig. 4.

In the preferred form for a rear quarter window the rear end of the glass is cut away at its upper corner to provide a straight tapered or beveled portion 11b and mounted on this inclined or tapered edge of the glass in a metal channel or retainer strip 19. This strip is preferably in the form of a felt lined channel which embraces the tapered edge 11b of the glass and is secured thereto. The channel or retainer strip 19 is provided with an upward or angularly projecting extension 20 which may comprise a plate spot welded to one face of the channel. This extension 20 has an upstanding cam slot 21 and the edges of the slot are preferably flared outwardly at 22, see Fig. 2, to provide a bearing for the tapered or conical sides of a stud 23 riveted at 23a to a swinging arm 24. The headed stud or button-like device 23 is yieldingly held in position against the flared bearing portions 22 of the cam slot by means of a washer 25 between which and the arm 24 is located a coil spring 26.

The swinging arm 24 of the regulator mechanism is pivoted at 27 to a supporting plate 28, the latter being provided with suitable apertured screw bosses to permit it to be attached by screws to the body between the inner and outer panels thereof. The supporting plate 28 is preferably mounted in the body above the rear sloping edge of the glass and in the present instance overlies the rear end of the window opening. Rotatably mounted on a stud or shaft 29 journaled in a suitable bearing in the plate 28 is a gear 30 having gear teeth meshing with the teeth of a pinion 31 which in turn is mounted to rotate on a stud 32 carried by the supporting plate. Fixed to the inner end of this stud or shaft 32 is a crank handle 33 which may be manually turned so as to rotate the pinion 31 and thereby the gear 30. Pivoted at 34 to one face of this gear is an arcuate arm or link 35 and the rear end of this arm is pivoted at 36 to the swinging arm 24 preferably at a point intermediate the pivot 27 and the cam stud 23. It will be noted that the forward end of the gear actuated arm 35 is pivoted at a point 34 which lies slightly above the horizontal plane of the gear axis 29 when the window is closed, and the relation of the pivots 34 and 36 to the pivotal axis 29 of the gear is such that when the arm 24 is swung to its extreme forward position, thus fully closing the window, the pivots 34 and 36 will lie in a line above and off center with respect to the axis 29. As a consequence, when the window glass is fully closed due to the off center position of the axis 29 with respect to the pivots 34 and 36, the regulator arm 24 will be locked against rearward movement except by manipulation of the crank handle 33. Hence, when the window is in fully closed position it is locked against movement as a result of forces applied directly to the window. This locking mechanism thus makes it possible to eliminate the usual clutch locking mechanism mounted on the pinion shaft 32.

From the foregoing it will be readily seen that the window glass 11 may be shifted rearwardly from its closed position by turning the handle 33 to rotate the pinion 31 and gear 30. Rotation of the gear shifts the arm or link 35 endwise and rearwardly thus swinging the arm 24 rearwardly. Movement of the arm 24 in this direction pulls the window glass rearwardly due to the travel of the stud or button 23 in the cam slot 21.

In the present regulator there has been shown an operating mechanism comprising a gear 30, pinion 31 and handle 33. It will be understood that, if desired, the gearing may be omitted and a rotatable member, such as a disk without gear teeth, may be substituted, with the link 35 pivoted thereto in the same manner as it is herein shown pivoted to the gear. Such member may be fixed to the shaft 29 and the crank handle may in turn be secured to this shaft so that upon turning the handle the member will be rotated to shift the link 35 in the manner above described.

The present invention provides a window regulator having all of the advantages of previous types of regulators yet with fewer parts. It provides a mechanism adaptable to various purposes in the operation of vehicle windows. Moreover, it provides a mechanism which may be located in a convenient but out of the way position for opening and closing a sliding rear quarter window, and provides a novel and advantageous way for controlling sliding ventilating windows, particularly of the rear quarter type.

By beveling or tapering the rear edge of the glass opposite the sloping rear end of the body and thus providing clearance for connecting the regulator to this edge, it will be seen that a maximum rearward travel of the glass is possible. The glass may, with this preferred arrangement, slide rearwardly in its plane past the supporting plate and connected parts substantially to the back wall of the body thereby providing, when desired, a maximum ventilating opening.

I claim:

1. In a vehicle body having a rear quarter window glass slidable horizontally in the plane of the window, window regulator mechanism connected to the rear end of the glass above the lower edge thereof for sliding the glass forwardly and rearwardly in its plane, and a supporting plate for said mechanism disposed above the lower edge of the glass and in a plane parallel thereto, said glass being shifted in its plane rearwardly to overlap said plate.

2. In a vehicle body having a rear quarter window opening and a window glass therein, a window regulator support secured to the body and at least in part overlying said opening, and window regulator mechanism carried by the support and connected to a rear portion of the glass above its lower edge for shifting the glass horizontally in its plane.

3. In a vehicle body having a rear quarter window opening and a glass panel for closing said opening, a retainer member secured to a rear edge of the panel between the upper and lower edges thereof, and window regulator mechanism connected to said retainer member for sliding the glass horizontally in its plane.

4. In a vehicle body having a rear quarter window opening and a glass panel for closing said opening, said panel having a rear inclined edge above the lower edge of the glass, and regulator mechanism connected to said inclined edge for sliding the glass horizontally in its plane.

5. In a vehicle body having a rear quarter window opening and a glass panel for closing said opening, said panel having a rear inclined edge above the lower edge of the glass, regulator mechanism including a swinging arm connected to said inclined edge for sliding said panel horizontally in its plane, and means coacting with said arm for locking the same when the window is closed.

6. In a window regulator for the rear quarter window glass of a vehicle body, mechanism connected to the rear end of the glass between the upper and lower edges of the glass for shifting the same horizontally in the plane of the window, said mechanism including a retainer member secured to an edge of the glass and a swinging arm connected to said member, said member and arm being provided with cooperating cam parts.

7. In a window regulator for the rear quarter window of a vehicle body, mechanism connected to the rear end of the window between the upper and lower edges of the window for shifting the same horizontally in the plane of the window, said mechanism including a retainer member at the edge of the window and a swinging arm provided with cooperating cam parts, and means for locking the arm when the window is closed.

8. In an automobile body having a rear quarter window glass mounted to slide horizontally in the plane of the glass and said glass at its upper rear portion having a straight edge inclined to the vertical, a retainer member secured to said straight edge, and regulator mechanism mounted above said rear portion and cooperating with said retainer member for shifting the glass forwardly and rearwardly in its plane.

9. In an automobile body having a rear quarter window glass mounted to slide horizontally in the plane of the glass, a retainer member secured to the upper edge of said glass and extending at an angle to the horizontal, and regulator mechanism mounted in the body above said glass and having means cooperating with said retainer member for shifting the glass forwardly and rearwardly in its plane.

JOHN H. ROETHEL.